(12) United States Patent
Allen et al.

(10) Patent No.: US 6,988,747 B2
(45) Date of Patent: Jan. 24, 2006

(54) MULTI-DIAMETER TUBE COUPLING

(75) Inventors: Kirk Allen, Valencia, CA (US); Lino De Los Santos, Walnut, CA (US); Bradley Helzer, Ontario, CA (US); Christopher Kee, Glendora, CA (US); John E. Thompson, Orange, CA (US)

(73) Assignee: Rain Bird Corporation, Glendora, CA (US)

( * ) Notice: Subject to any disclaimer, the term of this patent is extended or adjusted under 35 U.S.C. 154(b) by 0 days.

(21) Appl. No.: 10/394,343

(22) Filed: Mar. 20, 2003

(65) Prior Publication Data

US 2004/0183302 A1    Sep. 23, 2004

(51) Int. Cl.
*F16L 21/06* (2006.01)
(52) U.S. Cl. ..................... 285/322; 285/307
(58) Field of Classification Search ............. 285/322, 285/323, 340, 324, 307
See application file for complete search history.

(56) References Cited

U.S. PATENT DOCUMENTS

| | | | | |
|---|---|---|---|---|
| 3,633,944 | A | * | 1/1972 | Hamburg ...................... 285/81 |
| 4,257,629 | A | | 3/1981 | Maple et al. |
| 4,508,369 | A | * | 4/1985 | Mode ........................... 285/39 |
| 4,593,943 | A | * | 6/1986 | Hama et al. ................. 285/308 |
| 4,657,286 | A | | 4/1987 | Guest |
| 4,660,803 | A | * | 4/1987 | Johnston et al. .......... 251/149.1 |
| 4,722,560 | A | * | 2/1988 | Guest .......................... 285/323 |
| 4,919,457 | A | * | 4/1990 | Moretti ......................... 285/39 |
| 4,946,213 | A | * | 8/1990 | Guest ............................ 285/31 |
| 5,779,284 | A | * | 7/1998 | Guest .......................... 285/322 |
| 5,921,586 | A | | 7/1999 | Prassas et al. |
| 5,954,372 | A | | 9/1999 | Moynihan |
| 6,027,125 | A | | 2/2000 | Guest |
| 6,231,090 | B1 | * | 5/2001 | Fukao et al. ................. 285/340 |
| 6,302,451 | B1 | * | 10/2001 | Olson ........................... 285/330 |
| 6,464,266 | B1 | * | 10/2002 | O'Neill et al. ................ 285/340 |
| 6,517,124 | B1 | * | 2/2003 | Le Quere ..................... 285/340 |
| 6,722,702 | B1 | * | 4/2004 | Min-Cheol ..................... 285/45 |
| 2004/0240940 | A1 | | 12/2004 | Erickson et al. |

FOREIGN PATENT DOCUMENTS

| | | | | |
|---|---|---|---|---|
| GB | 2211506 | * | 7/1989 | ................. 285/323 |
| JP | 1206196 | * | 8/1989 | ................. 285/340 |

* cited by examiner

*Primary Examiner*—David Bochna
(74) *Attorney, Agent, or Firm*—Fitch, Even, Tabin & Flannery

(57) ABSTRACT

A multi-diameter tube coupling is provided for interconnecting flexible plastic tubing of the type used in drip irrigation systems and the like, wherein the tube coupling is adapted for use with a range of different tubing sizes. The tube coupling includes a central body defining an internal flow path, with a retainer collet mounted thereon at each open end of the flow path to capture a seal member having a compliant, pressure-activated seal lip. The retainer collet includes an annular array of lock fingers for unidirectional slide-fit locked reception of one end of a length of tubing within a range of different sizes, with the seal lip engaging the tubing to provide a substantially leak-proof connection. Alternatively, the collet lock fingers accommodate slide-fit locked reception of a barbed swivel adapter, with the seal lip engaging the adapter to provide a substantially leak-proof connection.

43 Claims, 5 Drawing Sheets

MULTI-DIAMETER TUBE COUPLING

BACKGROUND OF THE INVENTION

This invention relates generally to improvements in fluid connectors or couplings of the type used, for example, to interconnect lengths of flexible plastic tubing in a low flow or drip irrigation system or the like. More particularly, this invention relates to an improved tube coupling adapted for quick and easy, and substantially sealed connection to such tubing formed within a range of different external diameter sizes. Alternatively, the improved tube coupling of the present invention is also adapted for quick and easy connection by a swivel adapter to other types of water flow conduits such as PVC plastic pipe or the like.

Drip irrigation systems are well known in the art, wherein a plurality of low flow irrigation devices or heads are mounted at selected locations along a length of relatively lightweight, flexible plastic tubing. In such irrigation systems, the tubing is connected to a source or supply of water under suitable pressure for flow to each irrigation head through which the water is dispensed at a low flow rate, typically in a drip fashion, to predetermined sites such as specific plants or vegetation adjacent each irrigation head. To facilitate arrangement of the tubing and associated irrigation heads in the desired configuration, a plurality of tubing connectors or couplings are commonly provided to interconnect lengths of the tubing, wherein such couplings may comprise in-line connectors, elbow fittings, tee fittings, and the like.

In irrigation systems of this general type, the flexible plastic tubing may be provided in different standard diametric sizes, for example, such as 16 mm and 18 mm outer diameters. In the past, the associated tubing connectors have been designed for dedicated use with a single tubing size, whereby it has been necessary for manufacturers to produce tubing connectors in different sizes for use with different tubing. Moreover, for initial system installation and/or subsequent modification as may be required due to maturing vegetation and/or planting alternations, the customer has been required to obtain and use tubing connectors of the correct size. Unfortunately, tubing connectors of an incorrect size are often used, resulting in faulty connections that leak and waste water, or otherwise deliver irrigation water to undesired locations throughout the irrigation system.

There exists, therefore, a significant need for improvements in and to tube connectors or couplings for interconnecting flexible plastic tubing in an irrigation system or the like, wherein the improved tube connector or coupling is designed for substantially leak-free assembly with flexible plastic tubing selected from a range of different standard tubing sizes. The present invention fulfills these needs and provides further related advantages.

SUMMARY OF THE INVENTION

In accordance with the invention, a multi-diameter tube coupling is provided particularly for use in interconnecting flexible plastic tubing of the type used in drip irrigation systems and the like, wherein the tube coupling is adapted for use with a range of different tubing sizes. The multi-diameter tube coupling comprises a tubular central body defining an internal flow path therethrough, with a retainer collet mounted on the central body at each open end of the flow path to capture and retain an annular seal member having a compliant, pressure-activated seal lip. The retainer collet further includes a plurality of flexible, sharp-edged lock fingers oriented in an annular array to accommodate unidirectional sliding push-in and locked reception of one end of a length of tubing into and through the retainer collet and seal member, to extend partially into the central body engaging an internal stop formed therein. The seal lip sealingly engages an external surface of the inserted tubing having a diametric size within a range of different tubing sizes, to provide a substantially leak-proof connection even at relatively low water supply pressures.

In the preferred form, the internal stop within the central body comprises a plurality of at least three radially inwardly extending projecting stop tabs arranged at angular intervals about the flow path. These stop tabs are positioned for engagement by the axial ends of tubing lengths push-fitted into the coupling at opposing ends of the flow path. The stop tabs support and retain the tubing ends in axially spaced alignment for substantially unimpeded water flow therethrough.

The sharp-edged fingers on each retainer collet extend axially inwardly, with relatively sharp-edged distal end teeth each having an arcuate profile closely corresponding to the diametric profile of an associated length of tubing push-fitted into the coupling. Insertion of the tubing end radially expands the fingers sufficiently to bear against and compressively retain an annular base ring portion of the seal member. The tubing end is further inserted through the annular seal lip which resiliently expands to engage an exterior surface of the tubing within a range of standard tubing sizes. The sharp-edged distal end teeth of the lock fingers bite into the tubing exterior sufficiently to lock the tubing against slide-out removal from the coupling.

In one alternative preferred form of the invention, a swivel adapter is provided for suitable connection to an alternative size or type of water flow conduit, such as relative stiff or inflexible PVC plastic pipe, or a flexible hose having a size incompatible for push-in reception into one of the retainer collets on the multi-diameter tube coupling. The swivel adapter has a barbed insert end with a size and shape for quick and easy push-in, substantially snap-fit and axially locked engagement with the retainer collet lock fingers, in a manner permitting relative rotation between the swivel adapter and retainer collet. The seal lip engages an annular surface of the swivel adapter to provide a substantially leak-free connection.

Other features and advantages of the present invention will become more apparent from the following detailed description taken in conjunction with the accompanying drawings which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENTS

Figure 1:
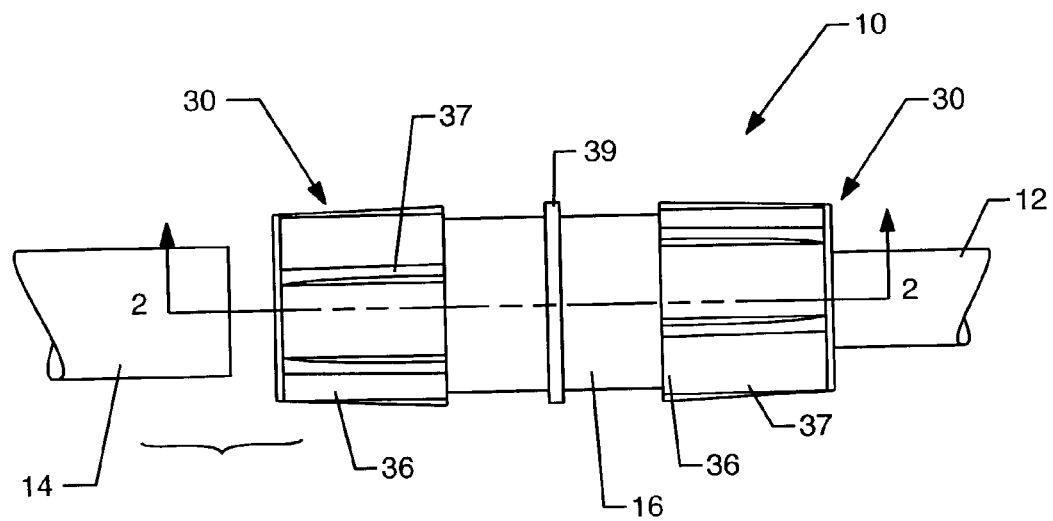
FIG. 1 is a side elevation view, showing partially exploded, of a multi-diameter tube coupling in accordance with the present invention.

As shown in the exemplary drawings, a multi-diameter tube coupling referred to generally in FIG. 1 by the reference numeral 10 is provided for quickly and easily interconnecting lengths of flexible plastic tubing 12 and 14 for substantially leak-free flow-through of fluid therebetween, particularly for use in a relatively low flow or drip flow irrigation system. The tube coupling 10 is designed for simple slide-fit and locked reception of the ends of the tubing 12 and 14 which can be provided within a range of different standard tubing sizes.

The tube coupling 10 of the present invention is particularly designed for use in low flow or drip flow irrigation systems wherein a tubing network is constructed from lengths of tubing and a plurality of tubing connectors, with associated irrigation heads (not shown) mounted on the tubing at appropriate locations for delivering irrigation water at a controlled slow flow rate to specific irrigation sites such as specific plants or vegetation adjacent each irrigation head. The tubing network is connected to a suitable source of water under pressure (also not shown) which flows through the tubing to each irrigation head in the system.

FIGS. 1–8 depict the tube coupling 10 of the present invention in one preferred form comprising an in-line tube connector for quickly and easily interconnecting adjacent ends of the tubing 12 and 14 in aligned end-to-end relation. As shown, the coupling 10 comprises a generally cylindrical central body 16 formed conveniently from lightweight molded plastic or the like to define a flow path 18 extending axially therethrough. This flow path 18 defines opposite open ends for slide-fit and locked reception of the tubing ends, as will be described in more detail.

Figure 2:
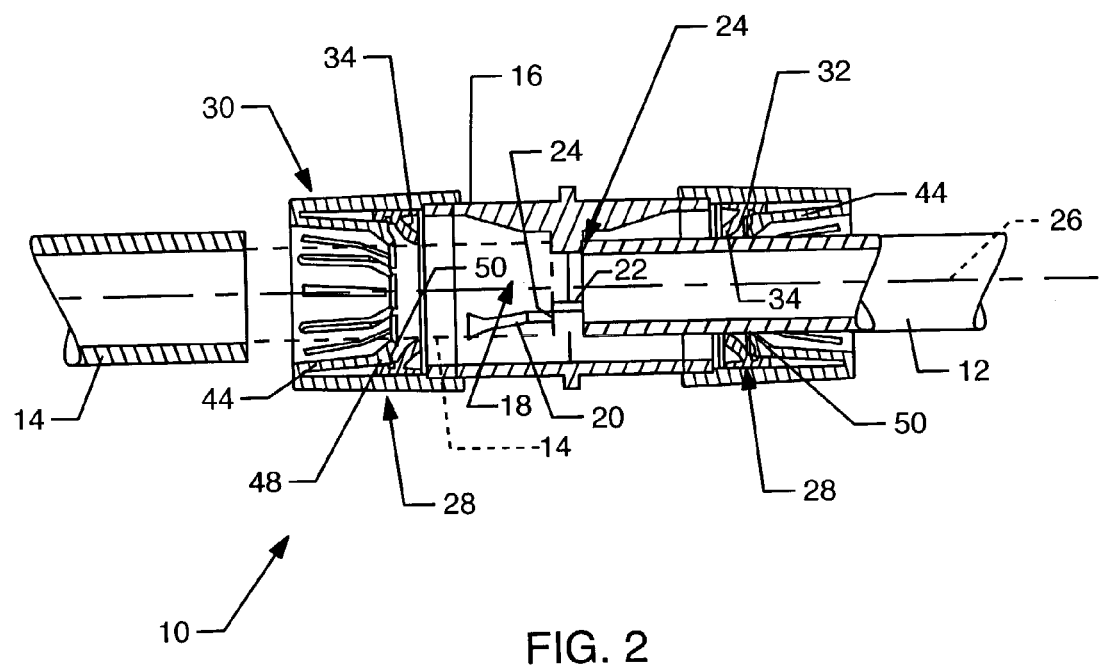
FIG. 2 is a sectional view taken generally on the line 2—2 of FIG. 1.
Figure 3:
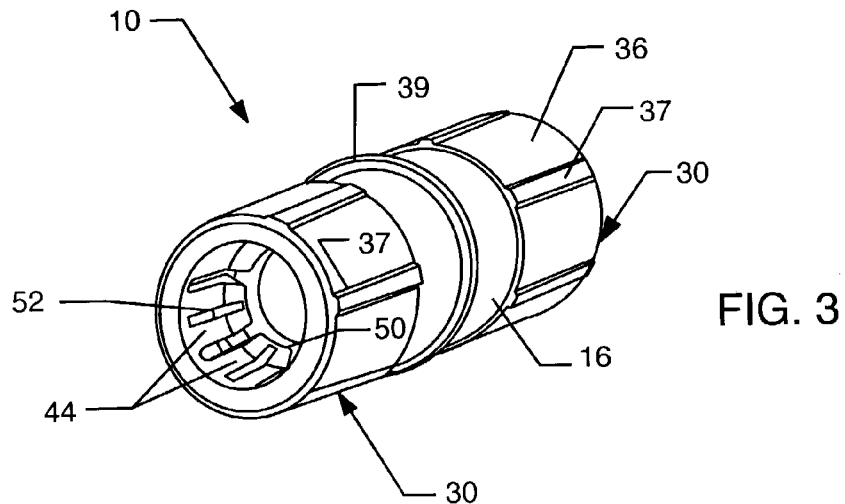
FIG. 3 is a perspective view of the multi-diameter tube coupling.
Figure 4:
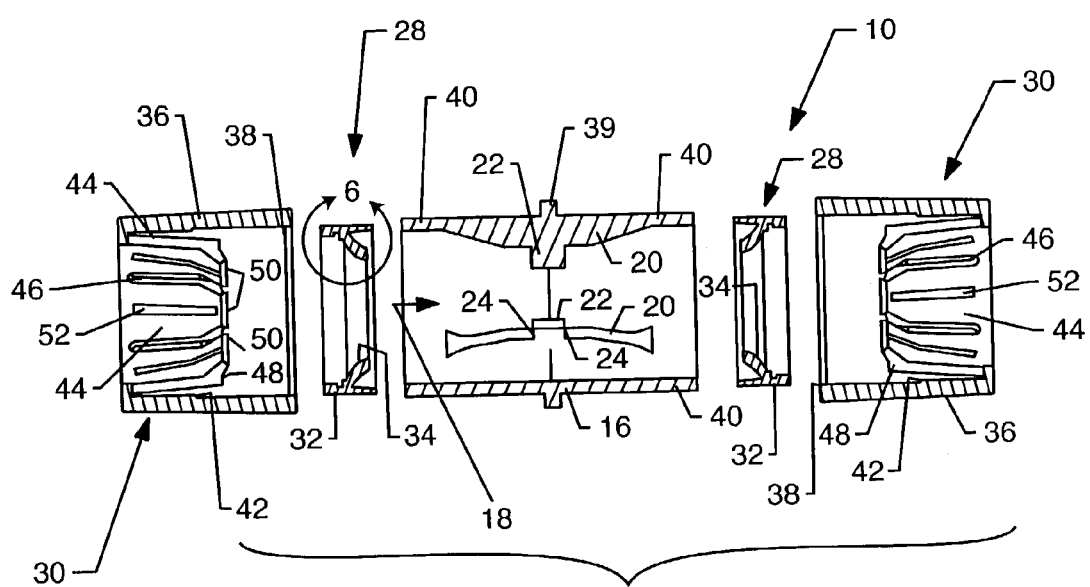
FIG. 4 is a sectional view similar to FIG. 2 but illustrating components of the multi-diameter tube coupling in exploded relation.
Figure 5:
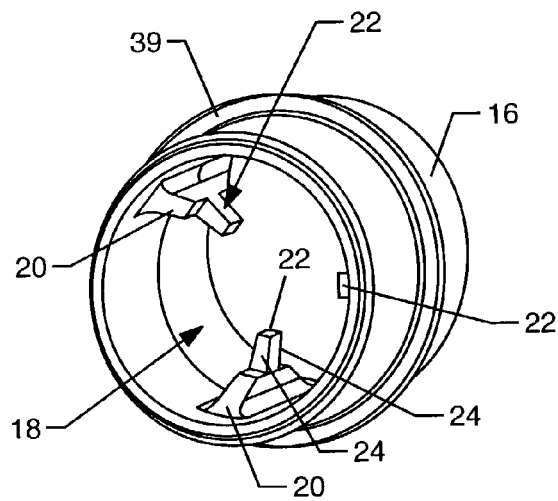
FIG. 5 is a perspective view of a central body of the tube coupling.

As shown best in FIGS. 2 and 4–5, the flow path 18 through the central body 16 is lined by a plurality of elongated axially extending guide ramps 20, three of which are shown formed at approximate equiangular intervals about the flow path interior. Each guide ramp 20 tapers radially inwardly from opposite ends thereof toward a centrally positioned stop tab 22 which projects radially inwardly to define a short step with axially opposed shoulders 24 extending generally perpendicular to a central axis 26 (FIG. 2) of the central body 16. As viewed in FIG. 2, the tapered guide ramps 20 function to center and retain the tubing ends press-fitted into the coupling 10 in substantial axial alignment and in slightly spaced relation for unimpeded water flow communication with the flow path 18 and between the lengths of tubing 12 and 14. The stop tabs 22 provide a positive end stop or backstop structure which can be readily tactile-sensed to indicate full or complete insertion of the tubing ends into the coupling 10.

Figure 6:
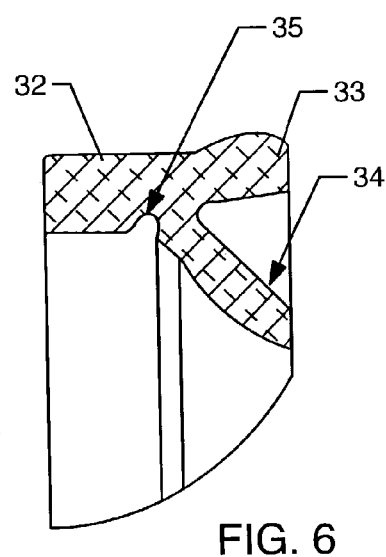
FIG. 6 is an enlarged and fragmented sectional view corresponding generally with the encircled region 6 of FIG. 4.
Figure 7:
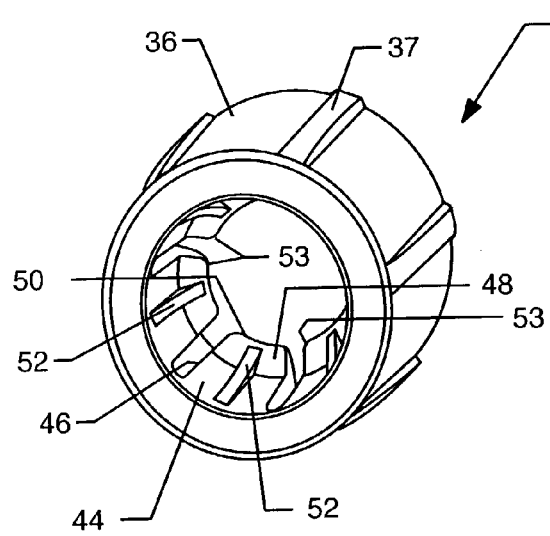
FIG. 7 is an outboard end perspective view of a retainer collet of the tube coupling.
Figure 8:
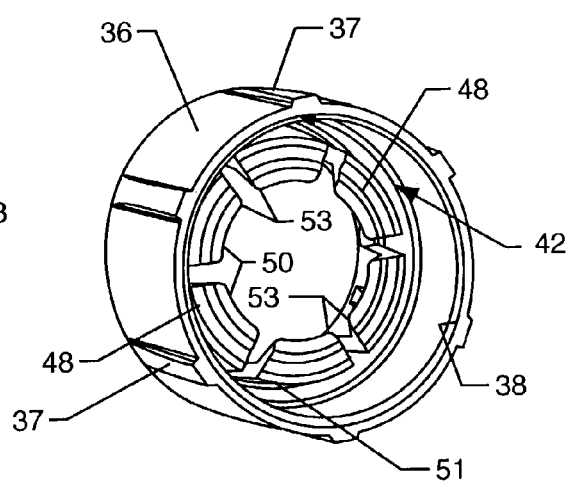
FIG. 8 is an inboard end perspective view of the retainer collet of FIG. 7.

A resilient seal member 28 is provided at each open end of the flow path 18 formed in the central body 16, and is retained in position by an associated retainer collet 30. More particularly, as shown in FIGS. 2, 4 and 6, the seal member 28 comprises a unitary seal component formed from a suitable elastomer to include an annular base ring portion 32 in combination with a radially inwardly extending and axially angled annular pliant seal lip 34. The base ring portion 32 of each seal member 28 is sized for substantially in-line positioning at the associated open end of the flow path 18 formed in the central body 16, with the seal lip 34 protruding radially inwardly and angling axially in an inboard direction toward the central body 16. In accordance with one primary aspect of the present invention, the pliant seal lip 34 is adapted to slidably receive and seal against the external surface of tubing selected from a range of different standard tubing sizes.

Each retainer collet 30, which may also be conveniently formed from lightweight molded plastic or the like, comprises a generally annular cap for mounting onto the central body 16 to capture and retain the seal member 28 at the associated end of the flow path 18. In this regard, each retainer collet 30 includes a generally cylindrical outer shell 36 (FIGS. 1–4, 7 and 8) having an internally countersunk leading end 38 (shown best in FIGS. 4 and 8) for positive seated reception of a matingly stepped outboard end 40 of the central body 16 (FIG. 4). With this interfitting geometry, each retainer collet 30 can be mounted quickly and easily onto the central body 16 in a predetermined assembled position, preferably by spin welding the retainer collet 30 onto the central body 16. The annular countersink 38 at the leading or inboard end of the collet shell 36 beneficially captures any excess weld material in a location spaced from the seal member 28 and other functional coupling components. An internal stepped shoulder 42 (FIGS. 4 and 8) formed within the collet shell 36 defines a positive stop in a predetermined location for engaging and supporting an axially outboard and preferably squared-off end of the seal member base ring portion 32. An axially upstream end of the seal member base ring portion 32 may include a rounded or bulged segment 33 (FIG. 6) for sealed engagement with an interior surface of the collet skirt 36. A shallow annular recess or relief 35 may also be formed in the seal member 28 at an outboard-side juncture of the seal lip 34 with the base ring portion 32, for improved seal lip flexibility. External ribs 37 may be provided on the retainer collet 30, and an external rib 39 on the central body 16, for appropriate engagement by tooling (not shown) to support the parts during spin welding.

Each retainer collet 30 further includes a plurality of integrally formed lock fingers 44, six of which are shown in the illustrative drawings, to accommodate unidirectional slide-in reception of the end of a length of tubing 12 or 14. These lock fingers 44 have outboard ends joined to the collet shell 36 generally at an outboard end thereof, and project therefrom in an inboard direction in slightly spaced or cantilevered relation radially inwardly from the collet shell 36. The lock fingers 44 are formed in a generally annular array, defined by intervening axially extending slots 46, so that distal ends 48 of the lock fingers 44 can flex in a radial direction to permit slide-fit reception of tubing within a range of different diametric sizes. As shown (FIG. 2), the lock finger distal ends 48 are axially positioned at the radially inboard sides of the seal member base ring portion 32 to assist in retaining the seal member 28 in position. In addition, these lock finger distal ends 48 include radially in-turned and relatively sharp-edged teeth 50 protruding radially inwardly and extending angularly in an axially inboard direction relative to the central body 16 and the flow path 18 formed therein. The sharp-edged teeth 50 on the lock fingers 44 have individual arcuate profiles (viewed best in FIGS. 3 and 7–8) formed on a common diameter which is equal to or slightly less than but closely matches the circular diametric profile of shape of the exterior surface of a length of tubing to be inserted into the coupling 10. Small support ribs 51 (FIG. 8) may be provided between the collet shell 36 and the outboard or base ends of the lock fingers 44 to compensate for post-mold part shrinkage.

In use, the lengths of tubing 12 and 14 are quickly and easily inserted into the tube coupling 10 to form a substantially leak-free interconnection. Each length of tubing 12, 14 is slidably press-fitted through the associated retainer collet 30, with narrow inclined ramps 52 (FIG. 7) formed on the outboard sides of the lock finger distal ends 48 for reducing insertion force and for conveniently guiding the tubing end for coaxial slide-fit passage through the sharp-edged lock finger teeth 50. The axially angled orientation of these sharp-edged teeth 50 permits substantially unrestricted unidirectional slide-in movement of the tubing end past the lock fingers 44 and the seal member 28 until the tubing end contacts and seats against the stop tabs 22 within the central body 16. Importantly, in accordance with one aspect of the invention, the arcuate profile shape of each tooth 50 is defined by smoothly rounded corners at opposite ends thereof (referred to by reference numeral 53 in FIGS. 7–8), wherein the inclusion of these smoothly rounded corners has been found to substantially avoid any significant scoring or biting of the teeth into the external surface of the tubing end during this insertion motion.

However, following such insertion of the tubing end, upon attempted withdrawal or retraction of the tubing end from the coupling 10, the sharp-edged teeth 50 of the lock fingers 44 engage and bite into the external surface of the tubing to lock the tubing against such retraction from the coupling 10. Moreover, tubing insertion through the lock fingers 44 results in radial expansion of the distal ends 48 thereof which press radially outwardly against the seal member base ring portion 32 to positively lock the seal member 28 in place. With this construction, it has been found that the seal lip 34 can be configured for enhanced resilience and improved seal performance by forming the seal lip with a thin-walled or thin-tapered construction, or by forming the entire seal member 28 from a softer elastomer material. In addition, the partially compressed base ring portion 32 of the seal member 28 provides a reaction force retaining the lock fingers 44 engaged with the inserted tubing end with a substantially uniformly distributed load that remains substantially constant over time.

The seal lip 34 of the seal member 28 resiliently stretches to seat firmly and seal against the exterior surface of inserted tubing, which, as noted above, is substantially unscored during insertion of the tubing end into the coupling 10 thereby providing a positive leak-free seal. The inserted tubing end may have a diametric size selected from a range of different and typically standard tubing sizes used in drip-type irrigation systems. In this regard, FIGS. 1 and 2 show the lengths of tubing 12 and 14 to have different diametric sizes, such as diametric sizes of about 16 mm and 18 mm, respectively, used commonly for drip irrigation systems. The tube coupling 10 can be used to interconnect tubing lengths of the same or different sizes, without requiring any modification or adaptation in or to the tube coupling. Upon initial supply of water to the tubing for an irrigation cycle, or during system operation at a low pressure such as about 5 psi, the resilient seal lip 34 provides a sealed interface with the smooth and unscored external surface of the inserted tubing to prevent low pressure leakage. As water pressure builds within the interior of the central body 16, this water pressure acts axially against the seal lip 34 to press the seal lip more firmly against the tubing exterior, resulting in an enhanced, pressure-activated seal. Moreover, upon such pressure increase, hoop stresses within the tubing produce slight radial expansion thereof to press the external tubing surface more firmly against the seal lip 34 for increased seal function.

Figures 9, 10:
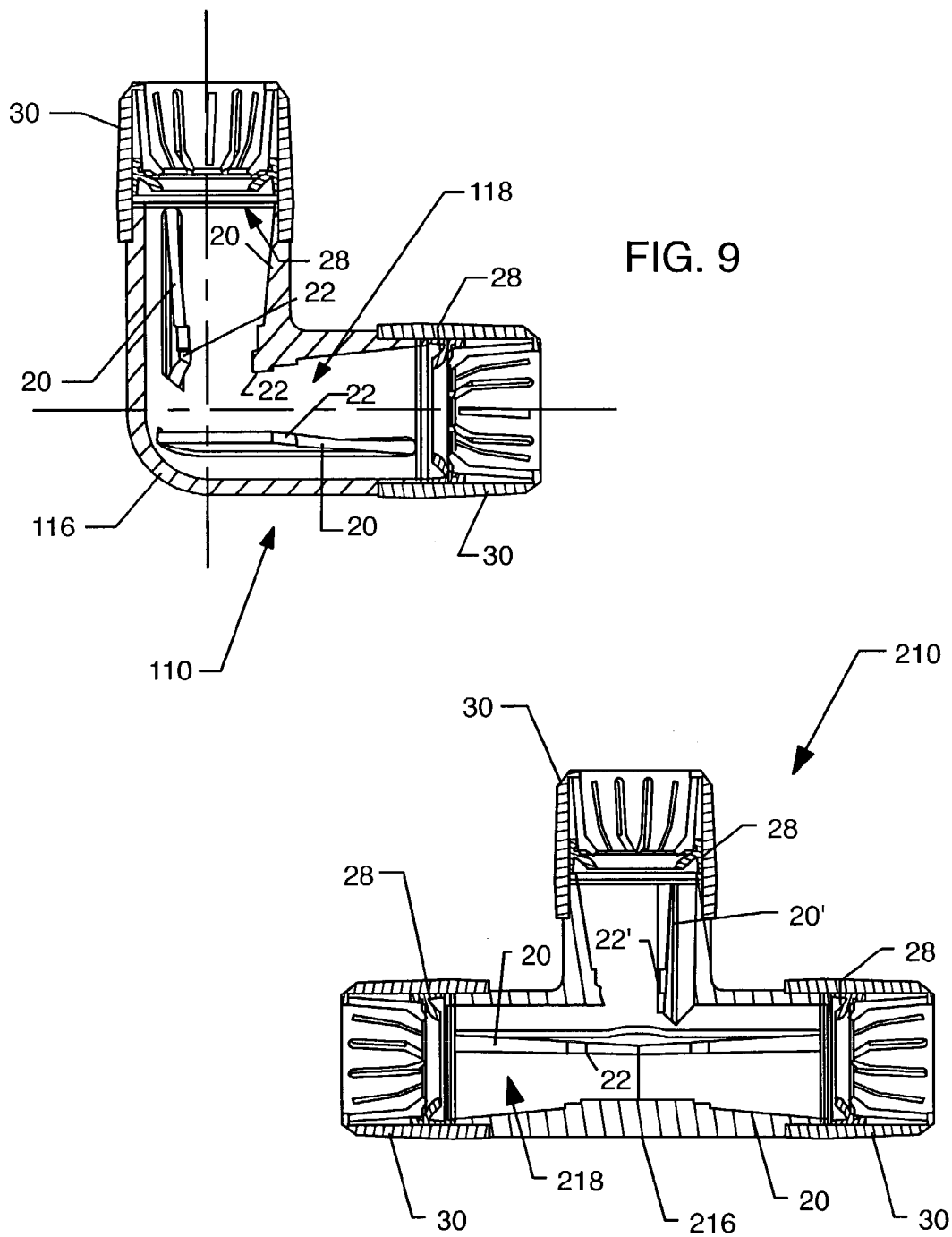
FIG. 9 is sectional view illustrating one alternative preferred form of the invention.
FIG. 10 is a sectional view illustrating another alternative preferred form of the invention.

While the tube coupling of the present invention has been shown and described in FIGS. 1–8 in the form of an in-line connector, persons skilled in the art will recognize and appreciate that alternative connector configurations may be used. For example, as viewed in FIG. 9, a modified central body 116 having a generally L-shaped configuration may be used to form an L-shaped or right angle tube coupling 110 having an L-shaped flow path 118 with a pair of seal members 28 and associated retainer collets 30 mounted at opposite ends thereof. In the embodiment of FIG. 9, separate sets of the tapered guide ramps 20 and associated stop tabs 22 are provided in each leg of the L-shaped flow path 118. Alternately, as viewed in FIG. 10, a further modified central body 216 having a generally T-shaped configuration may be used to form a T-shaped tube coupling 210. In this embodiment, the coupling 210 includes three seal members 28 and associated retainer collets 30 at each of the three open ends to a T-shaped flow path 218, and with a separate tapered guide ramp 20' with stop tab 22' provided in the third leg of the flow path. In the alternative embodiments of FIGS. 9–10, the seal members 28 and associated retainer collets 30 may be constructed and mounted in the same manner as previously described with respect to FIGS. 1–8.

Figure 11:
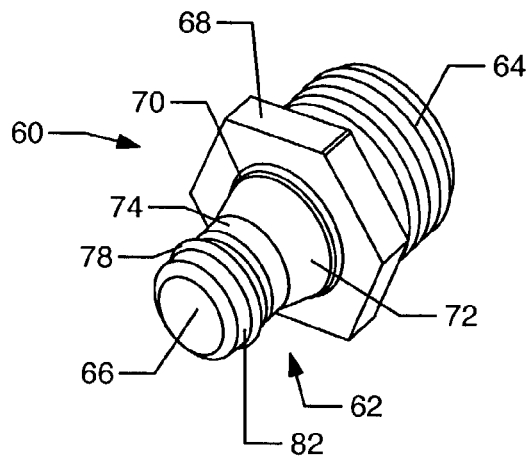
FIG. 11 is a perspective view of a swivel adapter for use with the multi-diameter tube coupling of FIGS. 1–10.
Figure 12:
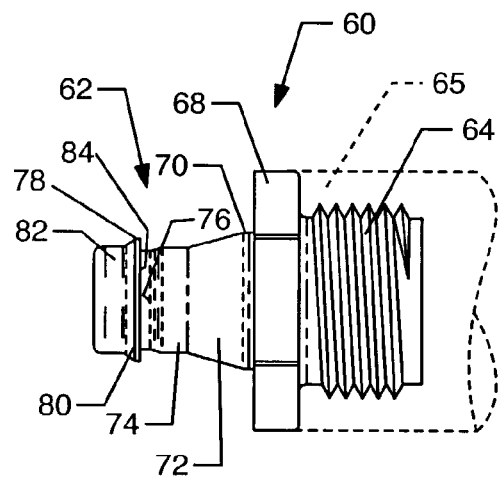
FIG. 12 is a side elevation view of the swivel adapter of FIG. 11.
Figure 13:
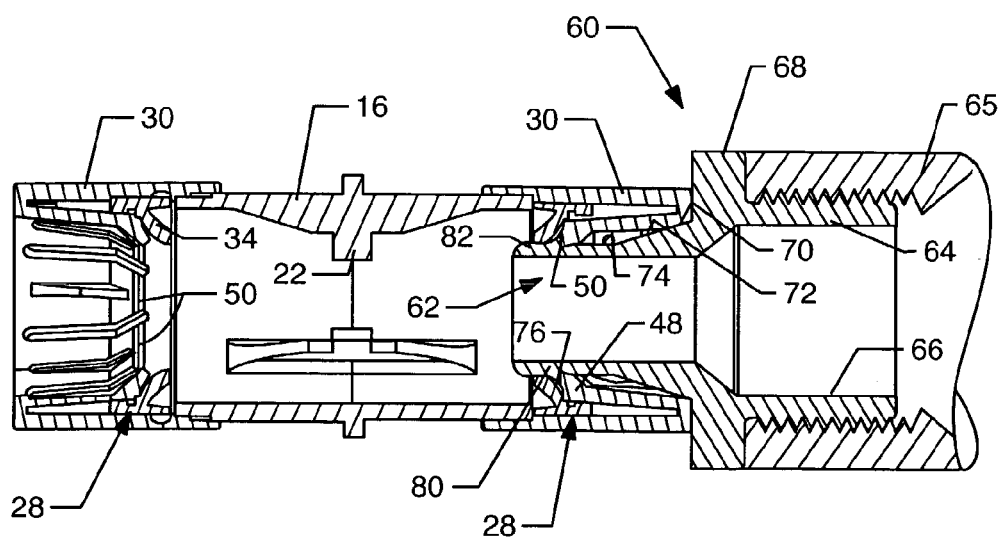
FIG. 13 is a fragmented sectional view similar to FIG. 2, but showing assembly of the swivel adapter of FIGS. 11–12 with the multi-diameter tube coupling.

A further alternative form of the invention is shown in FIGS. 11–13, wherein a swivel adapter 60 is provided for push-in, substantially snap-fit reception into a retainer collet 30 at one end, of the coupling 10. In general, this swivel adapter 60 includes a tubular first or barbed insert end 62 having a size and shape for quick and easy push-fit assembly with the coupling 10 to provide a substantially sealed or leak-proof connection wherein the swivel adapter 60 and the coupling 10 are rotatable relative to each other. An opposite or second tubular end of the swivel adapter 60 is configured for suitable connection to an alternative type of size of water flow conduit, such as the illustrative male threaded segment 64 for suitable connection to a conduit such as PVC plastic pipe 65, a hose fitting, or other conduit types known in the art.

More particularly, the swivel adapter 60 may be formed conveniently as a unitary plastic molding to define an internal flow path 66 extending from the barbed insert end 62 through the illustrative male thread segment 64. A radially enlarged central flange 68 is conveniently included and defines a hexagonal or other noncircular peripheral geometry for engagement and retention by an appropriate wrench (not shown) or the like for facilitated manipulation and handling. The barbed insert end 62 is defined by a relatively short and generally cylindrical first segment 70 protruding axially from one side of the flange 68 with substantially constant diametric size, and merging with a radially inwardly angled tapered zone 72 which merges in turn with a second generally cylindrical segment 74 or substantially constant diametric size. At least one recessed annular seat or groove 76 is formed at an outboard end of this second cylindrical segment 74. A radially enlarged and tapered barb 78 is formed in turn at an outboard end of this groove 76, wherein this barb 78 includes a ramped or tapered outboard surface 80 extending angularly in an axially inboard and radially outward direction from a relatively smooth and generally cylindrical nose end segment 82 of the barbed insert end 62. Accordingly, the tapered barb 78 is axially interposed between the recessed annular groove 76 and the smooth-surfaced nose segment 82.

The barbed insert end 62 of the swivel adapter 60 is assembled with one end of the coupling 10 by simple push-fit reception of the barbed insert end into the associated retainer collet 30. In this regard, the tapered surface 80 on the barb 78 engages and radially expands the distal ends 40 of the annular array of collet teeth 50 which then snap-fit into the recessed annular groove 76 at the inboard side of the barb 78. The geometry of the barb 78 at the inboard side thereof defines a substantially nontapered, radially extending shoulder 84 which functions to lock the collet teeth 50 within the groove 80, thereby substantially precluding axially separation of the adapter 60 from the coupling 10. However, the collet teeth 50 engaged within the adapter groove 76 accommodate swivel rotation of the adapter 60 relative to the coupling 10, or vice versa. Importantly, with the collet teeth 50 seated within the adapter groove 76, the seal lip 34 is positioned in pressure-activated sealing engagement with the smooth annular exterior surface of the nose end segment 82. This nose segment 82 is maintained substantially in coaxial alignment with the seal lip 34 by forming the cylindrical first segment 70 on the barbed insert end 62 for relatively close-fit reception into an outboard region of the retainer collet. The sealed character of this engagement is maintained during relative swivel movement of the components.

A variety of further modifications and improvements in and to the improved tube coupling of the present invention will be apparent to those persons skilled in the art. Accordingly, no limitation on the invention is intended by way of the foregoing description and accompanying drawings, except as set forth in the appended claims.

What is claimed is:

1. A tube coupling, comprising;
   a central body defining a fluid flow path extending therethrough;
   a retainer collet mounted on said central body at one end of said flow path for slidably receiving and supporting one end of a length of tubing in flow communication with said flow path, said retainer collet including an outer retainer shell supporting a plurality of lock fingers in a generally annular array for engaging an exterior surface of the tubing end to prevent retraction thereof from said retainer collet;
   a seal member including a generally annular and flexible seal lip for engaging the exterior surface of the tubing end, said seal lip sealingly engageable with said tubing end exterior surface within a range of diametric tubing sizes, wherein said seal member comprises a generally annular base ring portion interposed between said lock fingers and one axial end of said central body, said seal lip extending from said base ring portion generally radially inwardly and axially in an inboard direction relative to said central body; and
   an internal shoulder formed within said collet shell for seated support of an outboard axial end of said seal member base ring portion.

2. The tube coupling of claim 1 wherein said outboard axial end of said seal member base ring portion is squared off for seated support on said collet shell internal shoulder.

3. The tube coupling of claim 1 wherein said seal lip comprises a pressure activated seal.

4. The tube coupling of claim 1 further including at least one stop tab formed on said central body within said flow path for seated engagement with the tubing end, when the tubing end is received and supported by said retainer collet.

5. The tube coupling of claim 4 further including at least one tapered guide ramp formed on said central body within said flow path for guiding the tubing end into seated engagement with said at least one stop tab.

6. The tube coupling of claim 5 wherein said at least one stop tab comprises at least three stop tabs formed on said central body within said flow path at generally equiangular spaced relation, and further wherein said at least one guide ramp comprises at least three guide ramps associated respectively with said stop tabs.

7. The tube coupling of claim 1 wherein each of said lock fingers on said retainer collet includes a relatively sharp-edged lock tooth protruding radially inwardly and extending angularly in an axially inboard direction relative to said central body, each of said lock teeth having an arcuate, part-circumferential profile for engaging the external surface of the tubing end.

8. The tube coupling of claim 7 wherein said arcuate, part-circumferential profile of each of said lock teeth further includes smoothly rounded corners at opposite ends thereof.

9. The tube coupling of claim 1 wherein said plurality of lock fingers have outboard ends joined to said retainer shell generally at an outboard end thereof and extending therefrom generally in an inboard direction in an annular circumferentially spaced array and spaced radially inwardly from said retainer shell, said lock fingers further including distal ends each defining relatively sharp-edged lock tooth protruding radially inwardly and extending angularly in an axially inboard direction relative to said central body.

10. The tube coupling of claim 9 wherein said lock teeth defined on said lock fingers have an arcuate, part-circumferential profile formed on a common diameter for engaging the exterior surface of the tubing end.

11. The tube coupling of claim 10 wherein said arcuate, part-circumferential profile of each of said lock teeth further includes smoothly rounded corners at opposite ends thereof.

12. The tube coupling of claim 9 wherein said distal ends of said lock fingers cooperate with said retainer shell to support a portion of said seal member therebetween.

13. The tube coupling of claim 9 further including tapered ramps formed on said lock fingers generally at outboard sides of said lock teeth for slidably guiding the tubing end inserted through said retainer collet.

14. The tube coupling of claim 1 wherein said retainer collet includes an annular countersink at an inboard end thereof for slidably receiving said one end of said central body.

15. The tube coupling of claim 14 wherein said retainer collet has external ribs formed thereon to facilitate spin welding connection of said retainer collet onto said central body.

16. The tube coupling of claim 1 wherein said flow path extending through said central body comprises an in-line flow path.

17. The tube coupling of claim 1 wherein said flow path extending through said central body comprises an L-shaped flow path.

18. The tube coupling of claim 1 wherein said flow path extending through said central body comprises a T-shaped flow path.

19. A tube coupling, comprising;
a central body defining a fluid flow path extending therethrough;
a retainer collet mounted on said central body at one end of said flow path for slidably receiving and supporting one end of a length of tubing in flow communication with said flow path, said retainer collet including an outer retainer shell supporting a plurality of lock fingers in a generally annular array for engaging an exterior surface of the tubing end to prevent retraction thereof from said retainer collet;
a seal member including a generally annular and flexible seal lip for engaging the exterior surface of the tubing end, said seal lip sealingly engageable with said tubing end exterior surface within a range of diametric tubing sizes; and
a swivel adapter including a tubular first end for slide-fit rotatable reception into said retainer collet and having an annular groove for seated reception of said lock fingers therein, and a tubular second end for connection to a flow conduit, said tubular first end further including an annular nose segment for sealed engagement with said seal lip, and a tapered barb interposed axially between said nose segment and said annular groove, said tapered barb having a size and shape for substantially snap-fit reception past said lock fingers upon slide-fit reception of said tubular first end into said retainer collet.

20. The tube coupling of claim 19 wherein said tapered bard includes a ramped outboard surface for radially expanding said lock fingers upon slide-fit reception of said tubular first end into said retainer collet, and a substantially radially extending shoulder at an inboard side thereof for axially retaining said lock fingers within said groove.

21. The tube coupling of claim 20 wherein tubular first end includes a generally cylindrical first segment formed at an inboard side of said annular groove and in axially spaced relation to said nose segment, said cylindrical first segment having a size for relatively close slide-fit reception into said retainer collet.

22. A tube coupling, comprising:
a central body defining a fluid flow path extending therethrough;
a retainer collet mounted on said central body at one end of said flow path for slidably receiving and supporting one end of a length of tubing in flow communication with said flow path, said retainer collet including an outer retainer shell supporting a plurality of lock fingers in a generally annular array for engaging an exterior surface of the tubing end to prevent retraction thereof from said retainer collet; and
a seal member including a generally annular base ring portion interposed between said lock fingers and one axial end of said central body, and a flexible seal lip extending from said base ring portion generally radially inwardly and axially in an inboard direction relative to said central body, said seal lip engaging the exterior surface of the tubing end, with a range of diametric tubing sizes, slidably inserted into said retainer collet;
at least one stop tab formed on said central body within said flow path for seated engagement with the tubing end, when the tubing end is received and supported by said retainer collet;
at least one tapered guide ramp formed on said central body within said flow path for guiding the tubing end into seated engagement with said at least one stop tab; and
wherein said plurality of lock fingers have outboard ends joined to said retainer shell generally at an outboard end thereof and extending therefrom generally in an inboard direction in an annular circumferentially spaced array and spaced radially inwardly from said retainer shell, said lock fingers further including distal ends each defining relatively sharp-edged lock tooth protruding radially inwardly and extending angularly in an axially inboard direction relative to said central body, said lock teeth defined on said lock fingers have an arcuate, part-circumferential profile formed on a common diameter for engaging the exterior surface of the tubing end, said arcuate, part-circumferential profile of each of said lock teeth further includes smoothly rounded corners at opposite ends thereof, and said distal ends of said lock fingers cooperate with said retainer shell to support said base ring portion of said seal member therebetween.

23. A tube coupling, comprising;
a central body defining a fluid flow path extending therethrough, said flow path defining at least first and second open ends;
first and second retainer collets mounted on said central body respectively at said first and second open ends of said flow path, each for slidably receiving and supporting one end of a length of tubing in flow communication with said flow path, said retainer collets each including an outer retainer shell supporting a plurality of lock fingers in a generally annular array for engaging an exterior surface of the respective tubing end to prevent retraction thereof from said retainer collet; and
first and second seal members mounted respectively at said first and second open ends of said flow path, each of said seal members including a generally annular and flexible seal lip for engaging the exterior surface of the associated tubing end, said seal lip sealingly engageable with said associated tubing end exterior surface within a range of diametric tubing sizes, wherein said first and second seal members each comprise a generally annular base ring portion with said seal lip extending from said base ring portion generally radially inwardly and angularly in an axial direction, said first seal member base ring portion being interposed axially between said lock fingers of said first retainer collet and the first end of the central body and oriented with said seal lip protruding angularly in an inboard direction relative to said central body, and said second seal member base ring portion being interposed axially between said lock fingers of said second retainer collet and the second end of the central body and oriented with said seal lip protruding angularly in an inboard direction relative to said central body.

24. The tube coupling of claim 23 wherein each of said first and second retainer collets further includes an internal shoulder formed within said collet shell for seated support of an outboard axial end of said first and second seal member base ring portions, respectively.

25. The tube coupling of claim 24 wherein said outboard axial ends of said first and second seal member base ring portions are squared off.

26. The tube coupling of claim 23 wherein said seal lip comprises a pressure activated seal.

27. The tube coupling of claim 23 further including at least one stop tab formed on said central body within said flow path for seated engagement with the tubing ends received and supported by said first and second retainer collets.

28. The tube coupling of claim 27 further including at least one tapered guide ramp formed on said central body within said flow path for guiding the tubing ends into seated engagement with said at least one stop tab.

29. The tube coupling of claim 28 wherein said at least one stop tab comprises at least three stop tabs formed on said central body within said flow path at generally equiangular spaced relation, and further wherein said at least one guide ramp comprises at least three guide ramps associated respectively with said stop tabs.

30. The tube coupling of claim 29 wherein each of said stop tabs is associated with a pair of tapered guide ramps extending axially therefrom in opposite directions.

31. The tube coupling of claim 23 wherein each of said lock fingers on said first and second retainer collets includes a relatively sharp-edged lock tooth protruding radially inwardly and extending angularly in an axially inboard direction relative to said central body, each of said lock teeth having an arcuate, part-circumferential profile for engaging the external surface of the tubing end.

32. The tube coupling of claim 31 said arcuate, part-circumferential profile of each of said lock teeth further includes smoothly rounded corners at opposite ends thereof.

33. The tube coupling of claim 23 wherein said plurality of lock fingers on said first and second retainer collets have outboard ends joined to said retainer shell generally at an outboard end thereof and extending therefrom generally in an inboard direction in an annular circumferentially spaced array and spaced radially inwardly from said retainer shell, said lock fingers further including distal ends each defining relatively sharp-edged lock tooth protruding radially inwardly and extending angularly in an axially inboard direction relative to said central body.

34. The tube coupling of claim 33 wherein said lock teeth defined on said lock fingers have an arcuate, part-circumferential profile formed on a common diameter for engaging the exterior surface of the tubing end.

35. The tube coupling of claim 34 wherein said arcuate, part-circumferential profile of each of said lock teeth further includes smoothly rounded corners at opposite ends thereof.

36. The tube coupling of claim 33 wherein said distal ends of said lock fingers cooperate with said retainer shell to support a portion of said seal member therebetween.

37. The tube coupling of claim 23 further including tapered ramps formed on said lock fingers generally at outboard sides of said lock teeth for slidably guiding the tubing end inserted through said retainer collet.

38. A fluid coupling assembly, comprising:
a tube coupling including a central body defining a fluid flow path extending therethrough, a retainer collet mounted on said central body at one end of said flow path for slidably receiving and supporting one end of a length of tubing in flow communication with said flow path, said retainer collet including an outer retainer shell supporting a plurality of lock fingers in a generally annular array for engaging an exterior surface of the tubing end to prevent retraction thereof from said retainer collet, and a seal member including a generally annular and flexible seal lip for engaging the exterior surface of the tubing end; and
a swivel adapter including a tubular first end for slide-fit rotatable reception into said retainer collet and into said seal member and having an annular groove for seated reception of said lock fingers therein, and a tubular second end for connection to a flow conduit, said tubular first end further including an annular nose segment for sealed engagement with said seal lip, and a tapered barb interposed axially between said nose segment and said annular groove, said tapered barb having a size and shape for substantially snap-fit reception past said lock fingers upon slide-fit reception of said tubular first end into said retainer collet.

39. The fluid coupling assembly of claim 38 wherein said seal lip is sealingly engageable with said nose segment within a range of diametric sizes.

40. The fluid coupling assembly of claim 38 wherein said seal member is interposed axially between said lock fingers and one axial end of said central body.

41. The fluid coupling assembly of claim 38 wherein said seal lip comprises a pressure activated seal.

42. A fluid coupling assembly, comprising:
a tube coupling including a central body defining a fluid flow path extending therethrough, a retainer collet mounted on said central body at one end of said flow path for slidably receiving and supporting one end of a length of tubing in flow communication with said flow path, said retainer collet including an outer retainer shell supporting a plurality of lock fingers in a generally annular array for engaging an exterior surface of the tubing end to prevent retraction thereof from said retainer collet, and a seal member including a generally annular and flexible seal lip for engaging the exterior surface of the tubing end; and
a swivel adapter including a tubular first end for slide-fit rotatable reception into said retainer collet and having an annular groove for seated reception of said lock fingers therein, and a tubular second end for connection to a flow conduit, said tubular first end further including an annular nose segment for sealed engagement with said seal lip, and a tapered barb interposed axially between said nose segment and said annular groove, said tapered barb having a size and shape for substantially snap-fit reception past said lock fingers upon slide-fit reception of said tubular first end into said retainer collet wherein said tapered barb includes a ramped outboard surface for radially expanding said lock fingers upon slide-fit reception of said tubular first end into said retainer collet, and a substantially radially extending shoulder at an inboard side thereof for axially retaining said lock fingers within said groove.

43. The fluid coupling assembly of claim 42 wherein tubular first end includes a generally cylindrical first segment formed at an inboard side of said annular groove and in axially spaced relation to said nose segment, said cylindrical first segment having a size for relatively close slide-fit reception into said retainer collet.

* * * * *